United States Patent Office 3,553,165
Patented Jan. 5, 1971

3,553,165
METHOD FOR THE PREPARATION OF POLY-EPOXY CONDENSATES
Tomoo Kiryū, Zushi-shi, Japan, assignor to Chiyoda Kako Kensetsu Kabushiki Kaisha, Tokyo, Japan, a corporation of Japan
Filed Apr. 28, 1966, Ser. No. 546,055
Int. Cl. C08g 30/04
U.S. Cl. 260—47
7 Claims

ABSTRACT OF THE DISCLOSURE

Epoxy resins having a maximum softening point above 95–97° C. are prepared by condensation of β-methyl epichlorohydrin or β-chloromethyl epichlorohydrin with bisphenol-A in a single reaction step in the absence of a solvent other than dioxane.

---

Figure 1:
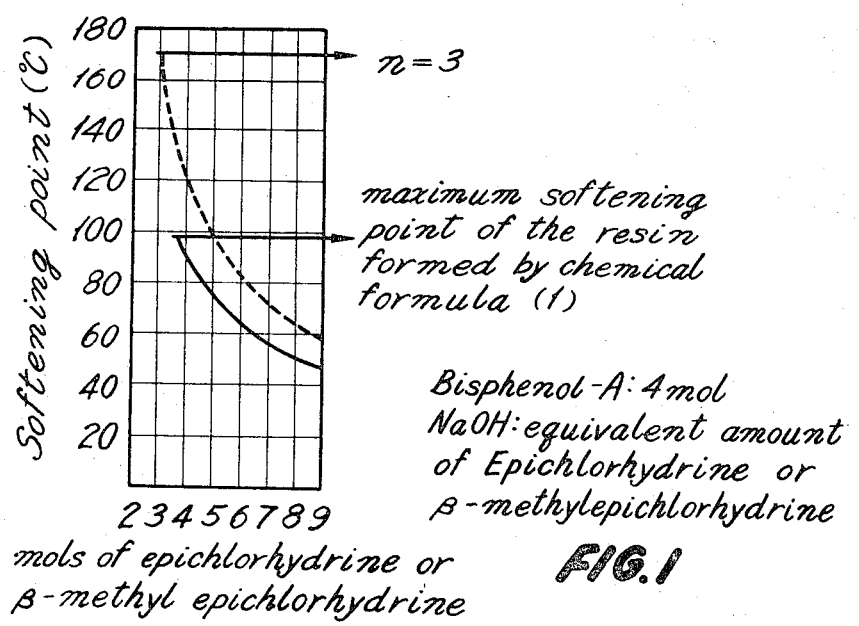

This invention relates to a method of manufacturing novel epoxy resin condensates.

More specifically, this invention relates to the manufacture of entirely novel epoxy resin condensates having high softening point through a single reaction step, that is, by condensation of β-methyl epichlorohydrine

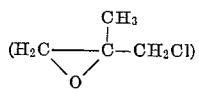

or β-chloromethyl epichlorohydrine

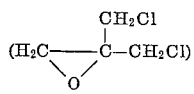

with 2,2-bis-(p-hydroxyphenyl)-propane (Bisphenol-A), in the absence of solvent or in the presence of dioxane. These compounds may be represented by the formula:

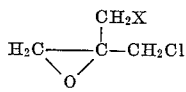

wherein X is hydrogen or chlorine.

It has been known in the art that high-molecular compounds are formed by condensation of polyhydric phenols with epichlorohydrines in the presence of alkaline solutions.

According to the known processes, the epoxy resin condensates which can be prepared by a single reaction step have maximum softening points of only 95 to 97° C. This may be attributed to the following presumption, for example in the reaction of epichlorohydrine with Bisphenol-A:

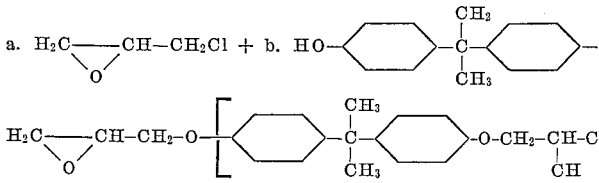 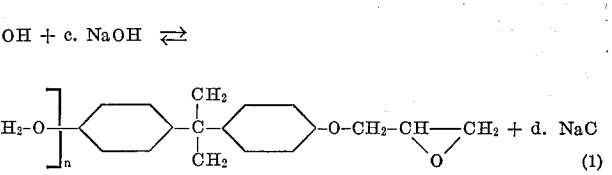

(1)

that is to say, when a reaction is effected by the addition of $c$ mol of caustic soda to $a$ mol of epichlorohydrine and $b$ mol of Bisphenol-A, a resin condensate corresponding to the first item on the right side of Formula 1 is made, accompanied by the formation of $d$ mol of sodium chloride, and the reaction of Formula 1 is terminated.

By the conventional methods of manufacturing epoxy resin condensates, the above product of a single-step reaction has an $n$ value of at most 2, which has chiefly been responsible for the low softening points of the condensates.

Therefore, to obtain resin condensates having higher softening points than the above mentioned maximum values, it is only necessary to eliminate any unrequired substance from the reaction system and permit further progress of the reaction rightwardly on the formula. This follows from the Le Chatelier-Brown Principle.

For example, in the reaction of Formula 1, the degree of condensation or the $n$ value of the epoxy resin can be increased beyond 2 by taking out the NaCl of the second term on the right side, from the reaction system.

There are several known operations. According to Reynolds' patented invention (Japanese patent publication No. 4,494/1953), an epoxy resin condensate is first prepared by the reaction of an excessive amount of epichlorohydrine with Bisphenol-A, the resin is washed with warm water to remove NaCl from the reaction system, and then a reaction is carried out again by the addition of Bisphenol-A and NaOH to the reaction system thereby to increase the $n$ value beyond 2.

In brief, a high softening-point substance is obtained by two reaction steps.

In Japanese patent publication No. 1,548/1957, also by Reynolds, there is described another procedure for removing NaCl from the reaction mixture.

The method consists of obtaining resin condensates having high softening points, or in which $n>2$, through a single reaction step with the use of water and water-insoluble solvent mixed beforehand in the reaction system. While the reaction proceeds in the solvent, NaCl formed by the reaction is transferred from the solvent to water. In other words, NaCl is extracted with water and the reaction is allowed to proceed rightwardly of the formula given hereabove.

In short, the products of conventional reaction steps have softening points of at most 95 to 97° C., and, in order to permit further progress of the condensation, it is essential to remove NaCl from the reaction system. For this reason, either a resin product is prepared first and NaCl is removed from the production system and then the above reaction is repeated thereby to obtain a substance of a high softening point, or the reaction is effected in a solvent which is insoluble in water and the NaCl secondarily produced is transferred into water and then the reaction is allowed to proceed thereby to obtain a resin condensate of a high softening point.

The present invention concerns a method whereby the difficulties involved in the complicated and troublesome process of conventional methods are overcome, and epoxy resin condensates having high softening points as compared with the products of ordinary methods are obtained by a novel, single-step operation. More particularly, the present invention concerns a method of obtaining resin condensates of high softening points by a single-step operation to make $n>2$.

The present invention provides a method of manufacturing epoxy resin condensates by the use of 3-methyl epichlorohydrin or 3 - chloromethyl epichlorohydrin in lieu of epichlorohydrine which have hitherto been in common use for this purpose. There is no precedent of the use of any such compound in the manufacture of epoxide resin condensates. It is expected, however, that these materials will become available in large amounts in the future, with the development of petrochemical industry. For example, bulk production of such a compound is readily made possible by chlorination of isobutene contained in the butane-butylene fraction.

Now a typical example of the invention using β-methyl epichlorohydrine (1,2 - epoxy - 2 - methyl-3-chloropropane), is illustrated by the following chemical formula.

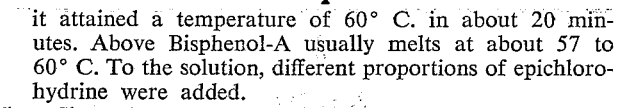

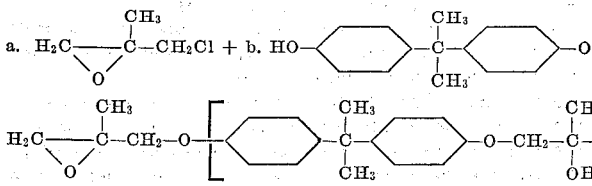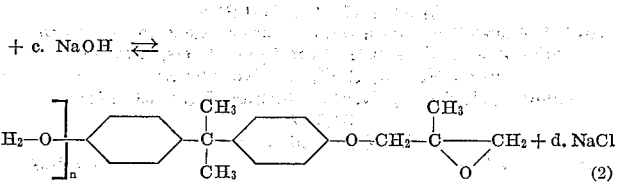

(2)

The softening point of the resin condensate thus obtained is remarkably high as compared with those of the resin condensates made by the use of epichlorohydrine.

In contrast to the cumbersome methods heretofore in use for enhancing the degrees of polymerization, the method provided by the present invention enables epoxy resin condensates having high degrees of polymerization, or high softening points, to be obtained without any forcible desalting operation but by mere washing of the reactant with water on completion of the reaction.

As described above, the present invention makes use of β-chloromethyl epichlorohydrin instead of epichlorohydrine generally in use. Therefore, practically all the reaction conditions employed in the conventional methods for the manufacture of epoxy resins from epichlorohydrine are applicable to the method of the present invention.

An exception is the use of dioxane as the solvent. It dissolves high-softening point resins formed and lowers the reaction temperature of the present invention, and brings a desirable effect of extremely lowering the viscosity of reaction mixture, thereby facilitating the stirring operation. The amount of dioxane to be used is approximately equal by weight to the total amount of reaction materials. Thus, the present invention covers the use of dioxane as the solvent.

Of course, it is claimed that the use of dioxane is covered by the invention even when the solvent is not specifically employed.

The resins obtained by the practice of the present invention are characterized by a far greater resistance to oils than the conventional epoxy resins.

For a better understanding thereof, the present invention is illustrated by the following examples, which are in no way restrictive.

EXAMPLE 1

Into an autoclave having a capacity of one liter, 4 mols of Bisphenol-A were introduced.

Various parts of a 11.6 wt. percent NaOH solution and β-methyl epichlorohydrine were added, and each mixture was stirred while being heated for 20 to 30 minutes. Stirring was carried out slowly at first and then vigorously by degrees after the start of condensation. The reaction temperature rose gradually from 100° C. up to 170° C. and the pressure reached 4 atm. After the reaction for about 30 minutes, the autoclave was opened, and the reaction product was washed with the same amount by weight of water, at 170° C. and under an increased pressure of 10 atm. for 20 minutes. The washing was repeated five or six times, and stopped when the washings attained a pH value of about 7.

Figure 2:
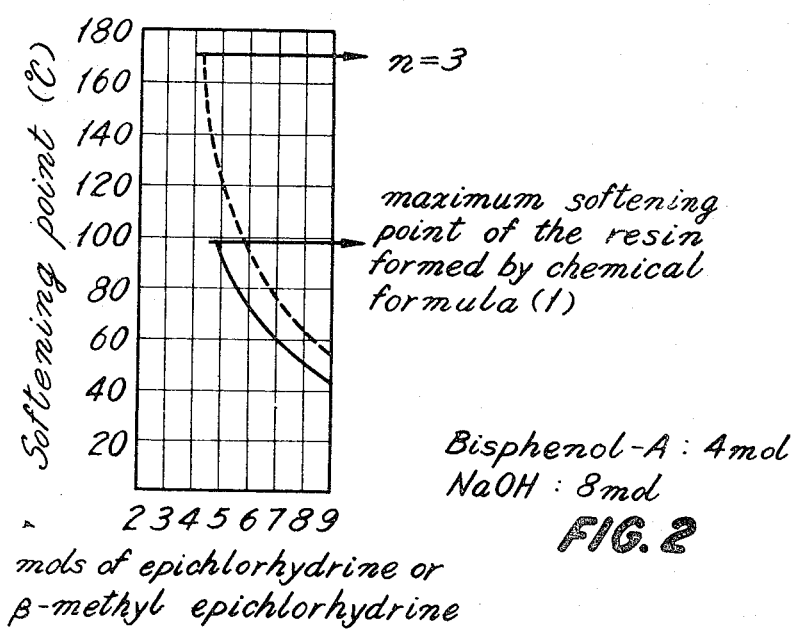

The softening points of the test specimens of resin condensates thus obtained (as determined in accordance with the rosin ring-ball method, JIS K-5902) are indicated by dotted lines in FIGS. 1 and 2.

Besides the above, epoxy resin specimens of a commonly known type were prepared in the following way.

Into a three-necked flask equipped with a cooler, a thermometer, and a stirrer, 4 mols of Bisphenol-A and various parts of a 11.6 wt. percent NaOH solution were introduced. Each mixture was heated at such a rate that it attained a temperature of 60° C. in about 20 minutes. Above Bisphenol-A usually melts at about 57 to 60° C. To the solution, different proportions of epichlorohydrine were added.

Since the reaction was exothermic, the reaction temperature would rise to about 90° C. Under the suitable controls, the temperature was kept within the range of about 75° to 80° C. In a few minutes, the mixture was whitened, but was continuously heated in the same temperature range for one hour. The reaction mixture gradually turned transparent and became homogeneous. Then, the total reaction product was washed with the same amount by weight of water for 15 to 20 minutes. This was repeated five to seven times until the washings attained a pH value of about 7.

Further, the resin thus obtained was heated, dried with stirring, and completely dehydrated with a temperature rise up to 170° C. The softening points of the resin condensate specimens thus obtained are indicated by full lines in FIGS. 1 and 2. The differences between the dotted lines and full lines were approximately 15 to 25° C. This means that the resins produced in accordance with the invention have softening points which are always higher by 15 to 25° C. than those of the conventional products obtained under similar reactive conditions.

While β-methyl epichlorohydrine was adopted in the above example, it may be substituted by β-chloromethyl epichlorohydrine to raise the softening point by about 30 to more than about 40° C., and the use of dioxane as a solvent vehicle causes a drop in the reaction temperature. These are illustrated by the following examples.

EXAMPLE 2

To a mixture consisting of one mol of β-methyl-epichlorohydrin, 2 mols of Bisphenol-A and 4 mols of dioxane as the solvent, 3 mols of an aqueous solution containing 10 wt. percent NaOH were added. The whole mixture was reacted under 2 atm. and at 100° C. The epoxy resin thus obtained, on washing with water and drying, had a softening point of 112° C. and an epoxy equivalent of 580. (When the solvent was not employed, the reaction temperature rose to about 120° C.) By contrast, an epoxy resin produced by a single-step reaction of the epichlorohydrin and Bisphenol-A of the same molar ratio as above in the absence of the solvent had a softening point as low as 93° C.

EXAMPLE 3

To a mixture consisting of one mol of β-methyl epichlorohydrin, ¾ mol of Bisphenol-A, and 3.5 mols of dioxane as the solvent, one mol of NaOH was added in the form of a 10 wt. percent aqueous solution. The whole mixture was reacted under 5.2 atm. and at 120° C. The epoxy resin which resulted had a softening point of 142° C. (When the solvent was not employed in the reaction, the reaction temperature increased to about 170° C.

However, as described in Example 2, the epoxy resin produced from epichlorohydrine and Bisphenol-A of the same molar ratio, but in the absence of the solvent, had a softening point of 95° C. at most.

EXAMPLE 4

To a mixture of one mol of epoxide of β-chloromethyl epichlorohydrin and 3 mols of Bisphenol-A, 2 mols of NaOH in the form of a 10 wt. percent aqueous solution were added, and the whole mixture was reacted at 170° C. and under 5.1 atm. The epoxy resin thus obtained, on washing with water and drying, had a softening point of 160° C. and an epoxy equivalent of 720. When dioxane was used as the solvent in this reaction, a reaction temperature of 120° C. was sufficient for the purpose. The softening point of the epoxy resin obtained by a single-step reaction of epichlorohydrine and Bisphenol-A of the same molar ratio as above but in the absence of the solvent was not beyond 98° C.

I claim:
1. Process for preparing an epoxy resin having a softening point above about 97° C. and having the formula

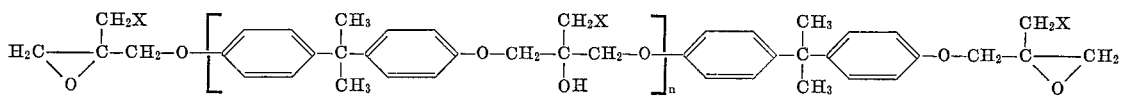

wherein $n$ is 2 to 3 and $X$ is hydrogen or chlorine, which process comprises (I) reacting in a single reaction step an epoxy compound of the formula

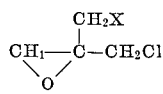

wherein X is hydrogen or chlorine with 2,2-bis-(p-hydroxyphenyl)-propane, the mole ratio of said epoxy compound to said 2,2-bis-(p-hydroxyphenyl)-propane being in the range of about 4/3:4 to about 9:4, said reaction being carried out (a) in a reaction medium consisting essentially of NaOH and a water-dioxane mixture and (b) at a temperature in the range of about 100° C. to about 170° C., and (II) recovering the resulting high-softening point epoxy resin having the above formula.

2. Process according to claim 1 wherein said reaction is carried out under super-atmospheric pressure.

3. Process according to claim 1 wherein said epoxy compound is β-methyl epichlorohydrin.

4. Process according to claim 1 wherein said epoxy compound is β-chloromethyl epichlorohydrin.

5. Process according to claim 1 wherein the mole ratio of said epoxy compound to said 2,2-bis-(p-hydroxyphenyl)-propane is in the range of about 3.6:4 to about 9:4.

6. Process according to claim 3 wherein the mole ratio of NaOH to said epoxy compound is in the range of about 1:1 to about 3:1, the mole ratio of said epoxy compound to said 2,2-bis-(p-hydroxyphenyl)-propane is in the range of about 2:4 to about 5⅓:4, and the amount of dioxane in said water-dioxane mixture is approximately equal by weight to the total amount of said epoxy compound and said 2,2 bis-(p-hydroxyphenyl)-propane.

7. Process according to claim 6 wherein the mole ratio of NaOH to said epoxy compound is about 2:1 and the mole ratio of said epoxy compound to said 2,2-bis-(p-hydroxyphenyl)-propane is about 4/3:4.

References Cited

UNITED STATES PATENTS 3,277,051   10/1966   Wynstra _____ 260—47EP
2,866,057   12/1958   Peck _____ 260—47 EPCN
3,305,528   2/1967   Wynstra et al. _____ 260—47EP

OTHER REFERENCES

Lee et al.: "Epoxy Resins," p. 15 relied on, McGraw-Hill Book Co., Inc. New York, 1957.

WILLIAM H. SHORT, Primary Examiner

T. E. PERTILLA, Assistant Examiner